(12) United States Patent
Yoshioka et al.

(10) Patent No.: US 7,614,305 B2
(45) Date of Patent: Nov. 10, 2009

(54) ULTRASONIC SENSOR

(75) Inventors: Tetsuo Yoshioka, Okazaki (JP); Makiko Sugiura, Hekinan (JP); Yasuyuki Okuda, Aichi-gun (JP); Takahiko Yoshida, Okazaki (JP); Kazuaki Watanabe, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/137,048

(22) Filed: Jun. 11, 2008

(65) Prior Publication Data

US 2008/0307888 A1     Dec. 18, 2008

(30) Foreign Application Priority Data

Jun. 12, 2007     (JP) .............................. 2007-155028

(51) Int. Cl.
*G01N 9/24*     (2006.01)
(52) U.S. Cl. .............................. 73/627; 73/587; 73/649
(58) Field of Classification Search .................. 73/584, 73/587, 591, 596, 617, 627, 649
See application file for complete search history.

(56) References Cited

U.S. PATENT DOCUMENTS

| | | | |
|---|---|---|---|
| 3,938,614 A * | 2/1976 | Ahs ............................ 181/129 |
| 6,876,127 B2 | 4/2005 | Mitsuoka et al. |
| 7,246,523 B2 * | 7/2007 | Magane et al. ................. 73/649 |
| 2003/0121331 A1 * | 7/2003 | Mitsuoka et al. .............. 73/632 |
| 2004/0161130 A1 * | 8/2004 | Suzuki ........................ 381/431 |
| 2004/0163883 A1 * | 8/2004 | Suzuki ........................ 181/173 |
| 2008/0072675 A1 | 3/2008 | Okuda et al. |

FOREIGN PATENT DOCUMENTS

| | | |
|---|---|---|
| JP | A-H5-347797 | 12/1993 |
| JP | A-08-175490 | 7/1996 |
| JP | A-H10-242539 | 9/1998 |
| JP | A-H11-178823 | 7/1999 |
| JP | A-2001-327494 | 11/2001 |
| JP | A-2002-174679 | 6/2002 |
| JP | A-2003-204595 | 7/2003 |
| JP | A-2007-088805 | 4/2007 |
| WO | WO 0247432 A1 * | 6/2002 |

OTHER PUBLICATIONS

Office Action dated Jan. 26, 2009 in corresponding patent application No. 2007-155028 (and English translation).

* cited by examiner

*Primary Examiner*—Hezron Williams
*Assistant Examiner*—Samir M Shah
(74) *Attorney, Agent, or Firm*—Posz Law Group, PLC

(57) ABSTRACT

An ultrasonic sensor includes an ultrasonic detector for detecting an ultrasonic wave, an acoustic matching member joined to the ultrasonic detector, a housing in which the ultrasonic detector and the acoustic matching member are accommodated, a vibration isolator located between the acoustic matching member and an inner side wall of the housing to damp an unwanted vibration from outside, and a cushion member located between the ultrasonic detector and an inner bottom wall of the housing to absorb external force applied to the ultrasonic sensor The cushion member is not in contact with the acoustic matching member.

19 Claims, 10 Drawing Sheets

ULTRASONIC SENSOR

CROSS REFERENCE TO RELATED APPLICATION

This application is based on and incorporates herein by reference Japanese Patent Application No. 2007-155028 filed on Jun. 12, 2007.

FIELD OF THE INVENTION

The present invention relates to an ultrasonic sensor constructed from a piezoelectric element joined to an acoustic matching member.

BACKGROUND OF THE INVENTION

Conventionally, an ultrasonic sensor has been proposed that is constructed from a piezoelectric element mounted on a base board made of metal, resin, or the like. In such an ultrasonic senor, an ultrasonic transmitter emits an ultrasonic wave, the emitted ultrasonic wave is reflected from an object to be detected, and an ultrasonic receiver receives the reflected ultrasonic wave. Based on the received ultrasonic wave, the ultrasonic sensor detects a location of the object, a distance from the object, a two-dimensional shape of the object, or a three-dimensional shape of the object.

An ultrasonic sensor disclosed in JP-A-H11-178823 includes a sensor probe constructed with a piezoelectric element for emitting and receiving an ultrasonic wave and an acoustic matching layer for increasing propagation efficiency of the ultrasonic wave. The piezoelectric element and the acoustic matching layer are coated with a high hardness packing material. Thus, the sensor probe is protected from degradation due to usage environmental factor such as moisture. However, since the piezoelectric element and the acoustic matching layer are entirely coated with the packing material, vibration of the received ultrasonic wave may be damped (i.e., weakened) by the packing material so that a detection sensitivity of the ultrasonic sensor may be reduced. Further, a detection error of the ultrasonic sensor may be caused by increased noise due to a resonant vibration of the packing material. Furthermore, since the packing material has high hardness, the package material may not absorb impact force applied to the sensor probe, and the sensor probe may be broken by the impact force. In addition, a detection error of the ultrasonic sensor may be caused by stress applied to the piezoelectric element due to thermal expansion and contraction of the packing material.

SUMMARY OF THE INVENTION

In view of the above-described problem, it is an object of the present invention to an ultrasonic sensor configured to be protected from degradation due to usage environmental factor without a detection sensitivity reduction.

According to an aspect of the present invention, an ultrasonic sensor includes an ultrasonic detector, an acoustic matching member, a housing, a vibration isolator, a protection cover, and a cushion member. The ultrasonic detector is configured to detect an ultrasonic wave reflected from a target to be detected. The acoustic matching member has a mounting surface to which the ultrasonic detector is mounted and a receiving surface opposite to the mounting surface and exposed to space where the target exists to receive the reflected ultrasonic wave. The acoustic matching member is configured to transfer the reflected ultrasonic wave received at the receiving surface to the ultrasonic detector mounted to the mounting surface. The ultrasonic detector and the acoustic matching member are accommodated in the housing. The housing has an opening through which the receiving surface of the acoustic matching member is exposed to the space. The housing is mountable to an object that uses the ultrasonic sensor. The vibration isolator is located between the acoustic matching member and a first portion of an inner side wall of the housing and fixes the acoustic matching member to the housing. The first portion of the inner side wall is located near the opening. The vibration isolator is configured to damp an unwanted vibration transferred from the object to the acoustic matching member. The surface of the ultrasonic detector is covered with the protection cover so that the ultrasonic detector can be protected from a usage environment factor such as moisture. The cushion member is configured to protect the ultrasonic detector from external force applied to the ultrasonic sensor. The cushion member includes at least one of a first cushion member and a second cushion member. The first cushion member is located between the ultrasonic detector and an inner bottom wall of the housing. The second cushion member is located between the ultrasonic detector and a second portion of the inner side wall of the housing.

According to another aspect of the present invention, the ultrasonic sensor includes a plurality of detector sets, each of which includes one acoustic matching member and one ultrasonic detector mounted to the acoustic matching member. The detector sets are arranged in an array. The vibration isolator is further located between adjacent acoustic matching members. The cushion member further includes a third cushion member located between adjacent ultrasonic detectors.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

First Embodiment

An ultrasonic sensor 10 according to a first embodiment of the present invention is described below with reference to the drawings. For example, the ultrasonic sensor 10 can be mounted to a vehicle and used as an obstacle sensor for detecting an obstacle ahead of the vehicle.

Figure 1A:
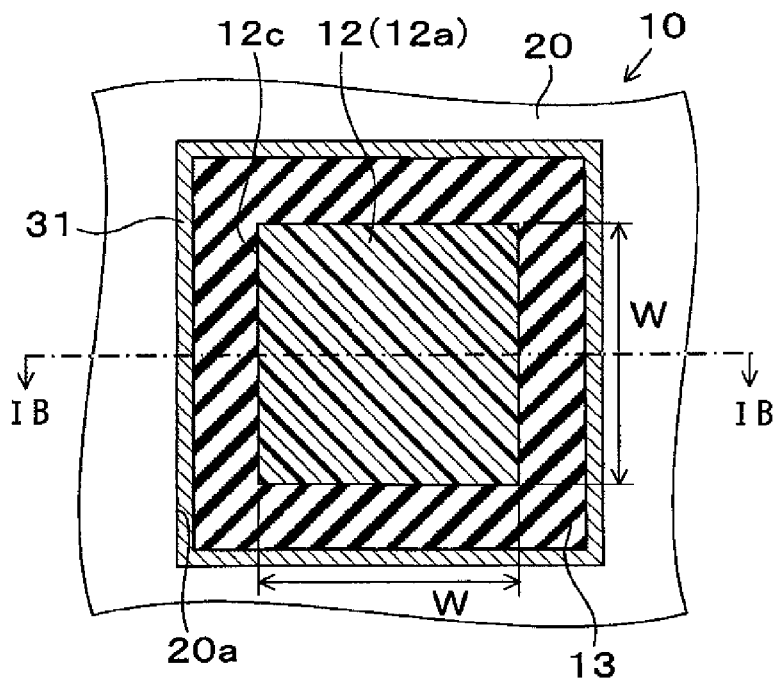
FIG. 1A is a diagram illustrating a top view of an ultrasonic sensor according to a first embodiment of the present invention.
Figure 1B:
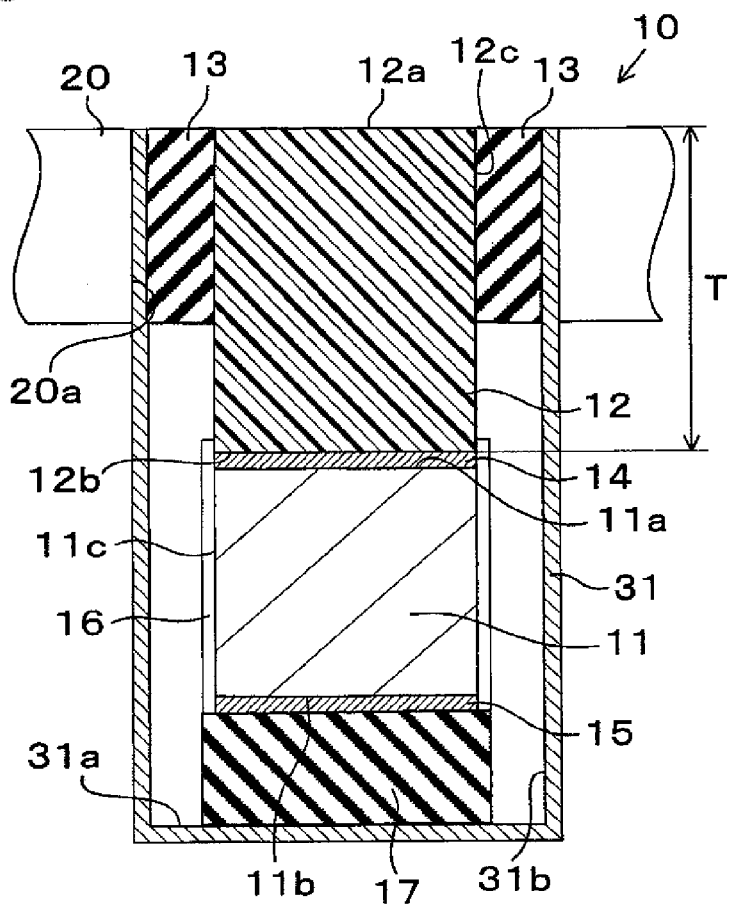
FIG. 1B is a diagram illustrating a cross-sectional view taken along line 1B-1B of FIG. 1A.

Referring now to FIGS. 1A, 1B, the ultrasonic sensor 10 includes an ultrasonic detector 11, an acoustic matching member 12, a vibration isolator 13, a protection cover 16, and a first cushion member 17. These components are accommodated in a housing 31. The ultrasonic detector 11 detects an ultrasonic wave that is emitted forward from the vehicle by an ultrasonic transmitter (not shown) and then reflected from the obstacle ahead of the vehicle. The acoustic matching member 12 receives the reflected ultrasonic wave and causes a vibration of the received ultrasonic wave to propagate to the ultrasonic detector 11. The vibration isolator 13 damps (i.e. reduces or prevents) an unwanted vibration transferred from outside to the acoustic matching member 12. The protection cover 16 covers a surface of the ultrasonic detector 11 to protect the ultrasonic detector 11 from a usage environmental factor such as moisture, dust, and/or the like. The first cushion member 17 protects the ultrasonic detector 11 from external force (e.g., stress, impact force) applied to the ultrasonic sensor 10. The housing 31 has a shape like a rectangle box with an opening.

Figure 10:
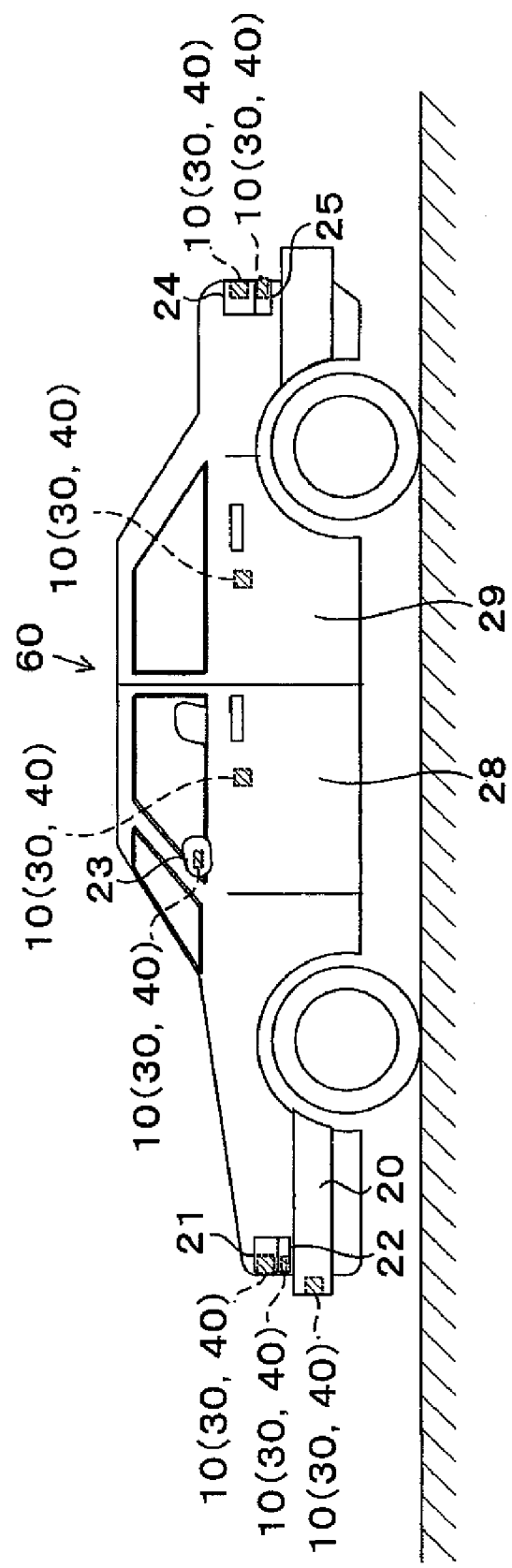
FIG. 10 is a diagram illustrating a vehicle to which the ultrasonic sensors according to the embodiments of the present invention are mounted.

The ultrasonic sensor 10 is mounted to a predetermined portion of the vehicle. For example, as shown in FIGS. 1A, 1B and FIG. 10, the ultrasonic sensor 10 can be mounted to a front bumper 20 of the vehicle. The front bumper 20 has a mounting hole for receiving the ultrasonic sensor 10. An outer side wall of the housing 31 near the opening is fixed to a mounting portion (i.e., inner wall) 20a of the mounting hole in such a manner that a receiving surface 12a of the acoustic matching member 12 can be exposed to an outside of the front bumper 20. For example, as shown in FIG. 1B, a surface of the front bumper 20 can be aligned with the opening of the housing 31

A side wall 12c of the acoustic matching member 12 near the receiving surface 12a is fixed to an inner side wall of the housing 31 near the opening through the vibration isolator 13. The vibration isolator 13 is located between the acoustic matching member 12 and the mounting portion 20a of the front bumper 20. The acoustic matching member 12 has a mounting surface 12b opposite to the receiving surface 12a. The ultrasonic detector 11 is fixed to the mounting surface 12b of the acoustic matching member 12, for example, using an adhesive agent. The first cushion member 17 is located between the ultrasonic detector 11 and an inner bottom wall 31a of the housing 31.

In the ultrasonic sensor 10, the ultrasonic wave, which is emitted by the ultrasonic transmitter (not shown) and then reflected from the obstacle, is received at the receiving surface 12a of the acoustic matching member 12. The received ultrasonic wave is transferred to the ultrasonic detector 11 via the acoustic matching member 12. The ultrasonic detector 11 detects the transferred ultrasonic wave and converts the detected ultrasonic wave to a voltage signal.

The ultrasonic detector 11 is electrically coupled to a processing circuit (not shown) such an electronic control unit (ECU) of the vehicle. The processing circuit performs calculations based on the voltage signal outputted from the ultrasonic detector 11. For example, the processing circuit calculates time and phase differences between the transmitted and reflected ultrasonic waves and measures a distance between the obstacle and the vehicle based on the calculated time and phase differences.

The ultrasonic detector 11 includes a piezoelectric body and a pair of electrodes 14, 15. The piezoelectric body has a shape like a rectangular cylinder and made of lead titanate zirconate (PZT), for example. The electrodes 14, 15 are formed to opposite surfaces 11a, 11b of the piezoelectric body so that the piezoelectric body is sandwiched between the electrodes 14, 15. For example, the electrodes 14, 15 can be formed by plating or sputtering of platinum (Pt) or copper (Cu), or by baking of conductive paste.

The acoustic matching member 12 has a shape like a rectangular cylinder with a substantially square cross-section. The acoustic matching member 12 is made of a material having an acoustic impedance that is greater than an acoustic impedance of air and less than an acoustic impedance of the ultrasonic detector 11. Thus, the ultrasonic wave reflected from the obstacle can be efficiently transferred to the ultrasonic detector 11. The acoustic matching member 12 can be, for example, made of polycarbonate resin, polyetherimide resin, or the like. Since such a resin material has an elasticity coefficient that can hardly change with temperature, a wavelength of an ultrasonic wave propagating in the acoustic matching member 12 can hardly change with temperature. Therefore, the ultrasonic sensor 10 can accurately detect the ultrasonic wave. Alternatively, the acoustic matching member 12 can be made of ceramic, glass, or metal such as aluminum.

A width W of the acoustic matching member 12 is set equal to or less than one-half of a wavelength of an ultrasonic wave in air. A thickness T of the acoustic matching member 12 is set equal to one-quarter of a wavelength of an ultrasonic wave in the acoustic matching member 12. For example, when a frequency of the ultrasonic wave is 65 kilohertz (kHz), the width W is set to about 2.6 millimeters (mm), and the thickness T is set to about 5 mm.

Since the thickness T of the acoustic matching member 12 is equal to one-quarter of the wavelength of the ultrasonic wave in the acoustic matching member 12, a standing wave is produced in the acoustic matching member 12. Therefore, interference and cancellation between an ultrasonic wave incident in the acoustic matching member 12 and an ultrasonic wave reflected at an interface between the ultrasonic detector 11 and the acoustic matching member 12 can be reduced. As a result, the incident ultrasonic wave is efficiently transferred to the ultrasonic detector 11.

Alternatively, the acoustic matching member 12 can have other shape than a rectangular cylinder with a substantially square cross-section. For example, the acoustic matching member 12 can have a shape like a circular cylinder. The width W of the acoustic matching member 12 can be set greater than one-half of a wavelength of an ultrasonic wave in air.

The vibration isolator 13 is located between the side wall 12c of the acoustic matching member 12 and the housing 31. The vibration isolator 13 fixes the acoustic matching member 12 to the housing 31 and damps (i.e., reduces or eliminates) an unwanted vibration transferred from the front bumper 20 of the vehicle to the acoustic matching member 12. The vibration isolator 13 is bonded to the side wall 12c of the acoustic matching member 12 and the inner side wall of the housing 31, for example, using an adhesive agent.

The vibration isolator 13 is made of a material having a high damping constant and having an acoustic impedance less than an acoustic impedance of the acoustic matching member 12. For example, the vibration isolator 13 is made of silicone rubber. Also, the vibration isolator 13 can be made of a material having a low elasticity coefficient and having a low density. For example, a foam material such as resin foam, foam rubber, or sponge rubber can be suitably used as a material for the vibration isolator 13. Since the vibration isolator 13 made of such a material is located between the front bumper 20 and the acoustic matching member 12, the vibration isolator 13 helps prevent the reflected ultrasonic wave from being transferred to the acoustic matching member 12 through the front bumper 20, thereby reducing noise. In particular, when the vibration isolator 13 is made of a material having a low elasticity coefficient, the ultrasonic wave propagating in the acoustic matching member 12 can be efficiently transferred to the ultrasonic detector 11 without being damped. Thus, the ultrasonic detector 11 can detect the ultrasonic wave with high sensitivity.

It is preferable that the vibration isolator 13 be bonded between the acoustic matching member 12 and the inner wall of the housing 31 using an adhesive agent that has an environmental resistance such as moisture resistance, oil resistance, chemical resistance, weather resistance, or the like. Further, it is preferable that the adhesive agent has an elasticity coefficient close to an elasticity coefficient of the vibration isolator 13. Adhesive force of the adhesive agent between the acoustic matching member 12 and the vibration isolator 13 can be improved by applying surface treatment such as primer treatment, ultraviolet (UV) light treatment, or coating treatment to at least one of bonded surfaces of the acoustic matching member 12 and the vibration isolator 13.

An exposed surface (i.e., side surface) of the piezoelectric body of the ultrasonic detector 11 is covered with the protection cover 16. The protection cover 16 is made of a material having a low elasticity coefficient and having an environmental resistance such as moisture resistance, oil resistance, chemical resistance, weather resistance, or the like. Specifically, the protection cover 16 can be made of a high-polymer material. For example, the protection cover 16 can be made of soft resin such as urethane, or a potting material such as rubber or silicon. The protection cover 16 is formed in a predetermined shape, for example, like a plate and then bonded to the exposed surface of the ultrasonic detector 11. Alternatively, the protection cover 16 can be formed by coating the exposed surface of the ultrasonic detector 11 with a gelled material. Alternatively, the protection cover 16 can be formed by coating the exposed surface of the ultrasonic detector 11 with liquid resin and then by hardening the coated resin. In such an approach, the protection cover 16 becomes thin so that adhesion between the ultrasonic detector 11 and the protection cover 16 can be increased.

It is preferable that the protection cover 16 be made as thin as possible not to affect the ultrasonic wave propagation. As shown in FIG. 1B, the protection cover 16 has a portion extending over the acoustic matching member 12 on the side of the first electrode 14. It is preferable that the length of the extending portion be made as short as possible not to damp the ultrasonic wave. Specifically, it is preferable that the length of the extending portion be less than 1 mm. Since the ultrasonic detector 11 is protected by the protection cover 16 from a usage environmental factor such as moisture, which degrades the ultrasonic detector 11, detection sensitivity of the ultrasonic detector 11 can be ensured. Accordingly reliability of the ultrasonic sensor 10 can be ensured.

The first cushion member 17 is made of a material having an elasticity coefficient less than an elasticity coefficient of the ultrasonic detector 11. Specifically, the first cushion member 17 can be made of a high-polymer material. For example, the first cushion member 17 can be made of soft resin such as urethane, or a potting material such as rubber or silicon, or the like. The first cushion member 17 is formed such that a shape of a cross section of the first cushion member 17 is equal to a shape of a cross section of the ultrasonic detector 11. The first cushion member 17 is located between the surface 11b of the ultrasonic detector 11 and the inner bottom wall 31a of the housing 31.

Even when impact force is applied to the receiving surface 12a of the acoustic matching member 12, for example, by a foreign matter (e.g., a small stone) hit against the receiving surface 12a during running of the vehicle, the first cushion member 17 absorbs the impact force transferred to the ultrasonic detector 11. Thus, the first cushion member 17 helps prevent the ultrasonic detector 11 from being cracked due to the impact force. Further, the first cushion member 17 helps prevent the ultrasonic detector 11 from being displaced toward the inner bottom wall 31a of the housing 31. Thus, the first cushion member 17 helps prevent the ultrasonic detector 11 from being detached from the mounting surface 12b of the acoustic matching member 12. In this way, the first cushion member 17 protects the ultrasonic detector 11 from external force applied to the ultrasonic sensor 10.

Since the elasticity coefficient of the first cushion member 17 is less than that of the ultrasonic detector 11, the first cushion member 17 can hardly affect the ultrasonic wave in the ultrasonic detector 11. Further, the first cushion member 17 is in contact with only the ultrasonic detector 11. In other words, the first cushion member 17 is not in contact with the acoustic matching member 12. In such an approach, the first cushion member 17 can hardly affect the ultrasonic wave in the acoustic matching member 12. Therefore, the detection sensitivity of the ultrasonic sensor 10 can be ensured. Furthermore, even when a temperature of the ultrasonic sensor 10 changes, stress due to thermal expansion and contraction of the first cushion member 17 is not applied to the ultrasonic detector 11. Therefore, detection error due to the stress can be prevented so that detection accuracy of the ultrasonic sensor 10 can be ensured.

It is preferable that the first cushion member 17 be made of a material having an elasticity coefficient of from about 0.1 Mega Pascals (MPa) to about 10 Giga Pascals (GPa). The impact force applied to the ultrasonic sensor 10 can be effectively absorbed by setting the elasticity coefficient of the first cushion member 17 equal to or less than 10 GPa. Further, even when stress such as bending stress is applied to the ultrasonic sensor 10 due to vibrations of the vehicle, the ultrasonic detector 11 can retain a correct posture by setting the elasticity coefficient of the first cushion member 17 equal to or greater than 0.1 MPa.

The first cushion member 17 can be made of the same material as the protection cover 16. In such an approach, the protection cover 16 and the first cushion member 17 can be integrally formed with each other so that the first cushion member 17 can have the same effect as the protection cover 16. Further, a manufacturing process of the ultrasonic sensor 10 can be simplified.

The first cushion member 17 is fixed to at least one of the second electrode 15, which is formed to the surface 1ib of the ultrasonic detector 11, and the inner bottom wall 31a of the housing 31 using an adhesive agent. Thus, displacement of the first cushion member 17 can be prevented so that the first cushion member 17 can retain a correct position. Alternatively, the first cushion member 17 can be fixed without using an adhesive agent. For example, the first cushion member 17 is formed to have a thickness greater than a clearance between the second electrode 15 and the inner bottom wall 31a of the housing 31. Then, the first cushion member 17 having the greater thickness is compressed to a thickness less than the clearance. Then, the compressed first cushion member 17 is inserted into the clearance. In such an approach, the first cushion member 17 can be fixed between the ultrasonic detector 11 and the housing 31 without using an adhesive agent.

It is preferable that a resonant frequency of the first cushion member 17 be greater than a frequency of a disturbance vibration of an object to which the ultrasonic sensor 10 is mounted. For example, when the ultrasonic sensor 10 is mounted to the vehicle, the disturbance vibration becomes large at a frequency less than 1 KHz. Therefore, when the ultrasonic sensor 10 is mounted to the vehicle, it is preferable that the resonant frequency of the first cushion member 17 be greater than 1 KHz. In such an approach, the ultrasonic sensor 10 can be prevented from resonating with the disturbance vibration of the vehicle. Thus, detection noise is reduced so that the detection accuracy of the ultrasonic sensor 10 can be improved.

Further, it is preferable that the resonant frequency of the first cushion member 17 is approximately equal to a resonant frequency of the ultrasonic detector 11. In such an approach, the ultrasonic wave transferred to the ultrasonic detector 11 is amplified so that the detection sensitivity of the ultrasonic detector 11 can be improved.

Figure 2A:
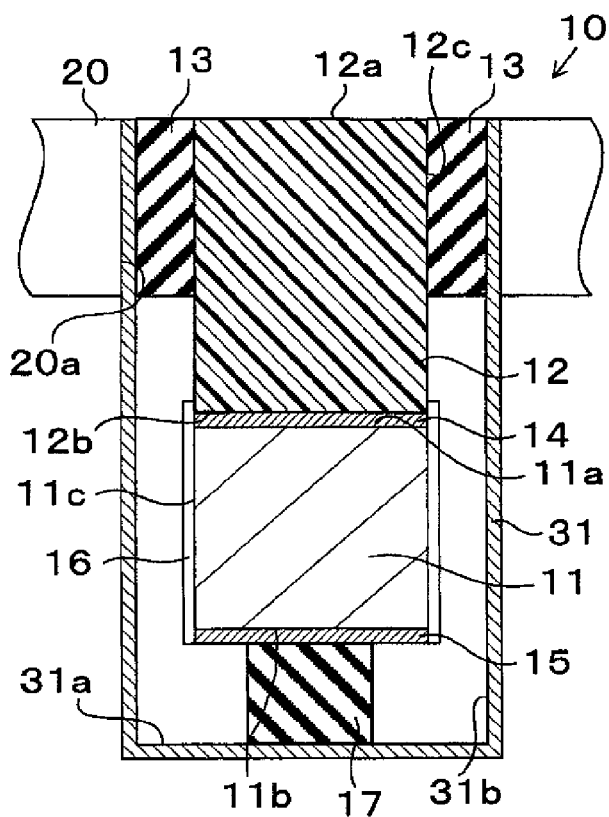
FIG. 2A is a diagram illustrating a cross-sectional view of an ultrasonic sensor according to a modification of the first embodiment.
Figure 2B:
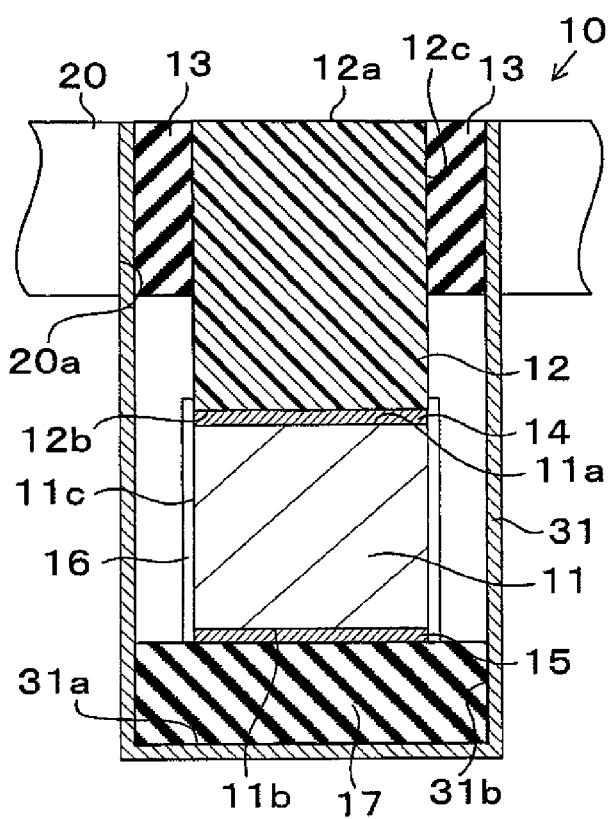
FIG. 2B is a diagram illustrating a cross-sectional view of an ultrasonic sensor according to another modification of the first embodiment.

As mentioned previously, in the first embodiment, the shape of the cross-section of the first cushion member 17 is set equal to that of the ultrasonic detector 11. Alternatively, as shown in FIG. 2A, the first cushion member 17 can have a cross-section smaller than that of the ultrasonic detector 11. Alternatively, the first cushion member 17 can have a cross-section larger than that of the ultrasonic detector 11. In particular, as shown in FIG. 2B, the first cushion member 17 can be entirely cover the inner bottom wall 31 a of the housing 31.

The protection cover 16 can cover not only the side surface of the piezoelectric body of the ultrasonic detector 11 but also the second electrode 15 of the ultrasonic detector 11. In such an approach, the second electrode 15 can be surely protected from a usage environmental factor such as moisture.

As described above, according to the first embodiment of the present invention, the ultrasonic sensor 10 includes the ultrasonic detector 11 for detecting the ultrasonic wave reflected from a target to be detected, the acoustic matching member 12 for causing the reflected ultrasonic wave to propagate to the ultrasonic detector 11, the housing 31 for accommodating the ultrasonic detector 11 and the acoustic matching member 12 and for mounting the ultrasonic sensor 10 to the front bumper 20 of the vehicle, and the vibration isolator 13 for fixing the acoustic matching member 12 to the housing 31 and for damping the unwanted vibration transferred from the front bumper 20 to the acoustic matching member 12.

The ultrasonic sensor 10 further includes the first cushion member 17 located between the ultrasonic detector 11 and the inner bottom wall 31a of the housing 31. Even when external force is applied to the ultrasonic sensor 10, the first cushion member 17 absorbs the external force so that the ultrasonic sensor 10 can be protected from the external force. Since the first cushion member 17 is in contact with only the ultrasonic detector 11, the first cushion member 17 can hardly affect the ultrasonic wave in the acoustic matching member 12. Therefore, the detection sensitivity of the ultrasonic sensor 10 can be ensured.

The ultrasonic sensor 10 further includes the protection cover 16, with which the exposed surface of the ultrasonic detector 11 is covered. Since the ultrasonic detector 11 is protected by the protection cover 16 from a usage environmental factor such as moisture, the detection sensitivity of the ultrasonic sensor 10 can be ensured.

In summary, according to the first embodiment, the ultrasonic sensor 10 can be protected from degradation, which caused by the external force and the usage environmental factor, without a reduction in the detection sensitivity. Further, since the elasticity coefficient of the first cushion member 17 is less than that of the ultrasonic detector 11, the first cushion member 17 can hardly affect the ultrasonic wave in the ultrasonic detector 11. Thus, the ultrasonic wave reflected from the target can be detected by the ultrasonic detector 11 with high sensitivity. The detection sensitivity of the ultrasonic sensor 10 can be improved by setting the resonant frequency of the first cushion member 17 approximately equal to the resonant frequency of the ultrasonic detector 11. The detection accuracy of the ultrasonic sensor 10 can be improved by setting the resonant frequency of the first cushion member 17 greater than the frequency of the disturbance vibration of the vehicle.

Second Embodiment

Figure 3:
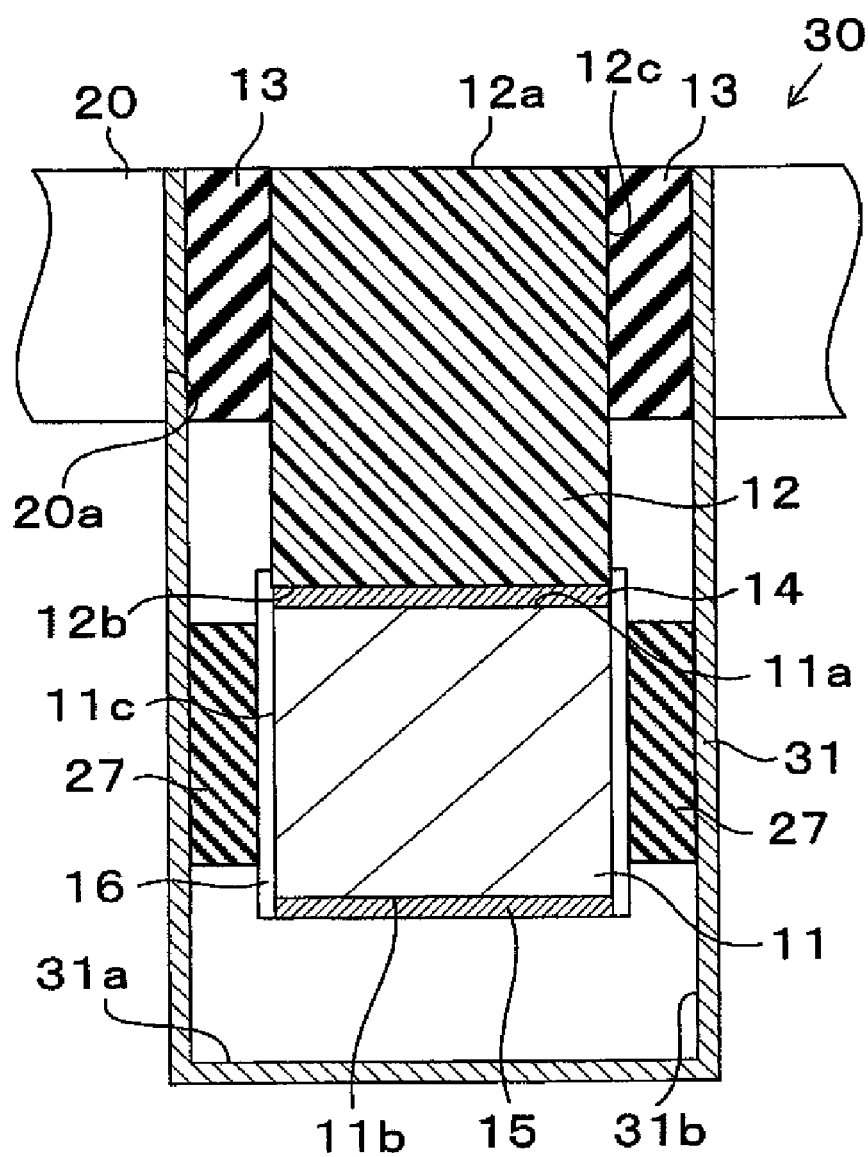
FIG. 3 is a diagram illustrating a cross-sectional view of an ultrasonic sensor according to a second embodiment of the present invention.

An ultrasonic sensor 30 according to a second embodiment of the present invention is described below with reference to FIG. 3. Differences between the first and second embodiments are as follows. As shown in FIG. 3, the ultrasonic sensor 30 includes second cushion members 27 instead of the first cushion member 17.

The second cushion members 27 are made of a material having the same characteristics (e.g., elasticity coefficient) as the material of which the first cushion member 17 is made. While the first cushion member 17 is located between the second electrode 15 of the ultrasonic detector 11 and the inner bottom wall 31 a of the housing 31, each second cushion member 27 is located between a side wall 11c of the ultrasonic detector 11 and an inner side wall 31b of the housing 31. To be more exact, the protection cover 16 is located between the side wall 11c of the ultrasonic detector 11 and the second cushion member 27.

The second cushion members 27 are located opposite each other across the ultrasonic detector 11. When the ultrasonic detector 11 has a shape like a rectangular cylinder (i.e., the ultrasonic detector 11 has four side walls 11c), the second cushion members 27 are respectively placed between a pair of opposites side walls 11c of the ultrasonic detector 11 and the inner side wall 31b of the housing 31. It is preferable that a clearance between one of the opposite side walls 11c and the inner side wall 31b is equal to the other of the opposites side walls 11c and the inner side wall 31b. In such an approach, the second cushion members 27 have the same thickness and are symmetrically arranged with respect to the ultrasonic detector 11. Therefore, when a temperature of the ultrasonic sensor 30 changes, the amount of thermal expansion and contraction of the second cushion members 27 becomes equal to each other. Accordingly, stresses applied by the second cushion members 27 to the opposite side walls 11c are balanced so that detection accuracy of the ultrasonic sensor 30 can be ensured.

The second cushion member 27 can have the same effect as the first cushion member 17. Specifically, even when impact force is applied to the receiving surface 12a of the acoustic matching member 12, for example, by a foreign matter (e.g., a small stone) hit against the receiving surface 12a during running of the vehicle, the second cushion member 27 absorbs the impact force transferred to the ultrasonic detector 11. Thus, the second cushion member 27 helps prevent the ultrasonic detector 11 from being cracked due to the impact force. Further, the second cushion member 27 helps prevent the ultrasonic detector 11 from being displaced toward the inner side wall 31b of the housing 31. Thus, the second cushion member 27 helps prevent the ultrasonic detector 11 from being detached from the mounting surface 12b of the acoustic matching member 12. In this way, the second cushion member 27 protects the ultrasonic detector 11 from external force applied to the ultrasonic sensor 30.

The elasticity coefficient of the second cushion member 27 is set less than that of the ultrasonic detector 11, and the second cushion member 27 is in contact with only the ultrasonic detector 11. In such an approach, the second cushion member 27 can hardly affect the ultrasonic wave in the ultrasonic detector 11 and the acoustic matching member 12. Therefore, the detection sensitivity of the ultrasonic sensor 30 can be ensured.

Like the first cushion member 17, it is preferable that the second cushion member 27 be made of a material having an elasticity coefficient of from about 0.1 MPa to about 10 GPa. Also, it is preferable that a resonant frequency of the second cushion member 27 be approximately equal to the resonant frequency of the ultrasonic detector 11.

The second cushion member 27 is fixed to at least one of the side wall 11c of the ultrasonic detector 11 (through the protection cover 16) and the inner side wall 31b of the housing 31 using an adhesive agent. Thus, displacement of the second cushion member 27 can be prevented so that the second cushion member 27 can retain a correct position. Alternatively, the second cushion member 27 can be fixed without using an adhesive agent. For example, a second cushion member 27 is formed to have a thickness greater than the clearance between the ultrasonic detector 11 and the inner side wall 31b of the housing 31. The second cushion member 27 having the greater thickness is compressed to a thickness less than the clearance. Then, the compressed second cushion member 27 is inserted into the clearance. In such an approach, the second cushion member 27 can be fixed between the ultrasonic detector 11 and the housing 31 without using an adhesive agent. Alternatively, the second cushion member 27 can be formed by filling the clearance with a potting material.

The shape of the second cushion member 27 can be modified in various manners. For example, the second cushion member 27 can be made as a one-piece member having a rectangular ring shape to surround the ultrasonic detector 11 along the side wall 11c. In this case, an inner perimeter of the ring-shaped second cushion member 27 can be set slightly less than an outer perimeter of the ultrasonic detector 11 along the side wall 11c, and an outer perimeter of the ring-shaped second cushion member 27 can be set slightly greater than an inner perimeter of the housing 31 along the inner side wall 31b. In such an approach, the ring-shaped second cushion member 27 can be fixed between the ultrasonic detector 11 and the housing 31, without using an adhesive agent, by inserting the ring-shaped second cushion member 27 in the clearance between the ultrasonic detector 11 and the housing 31.

Figure 4:
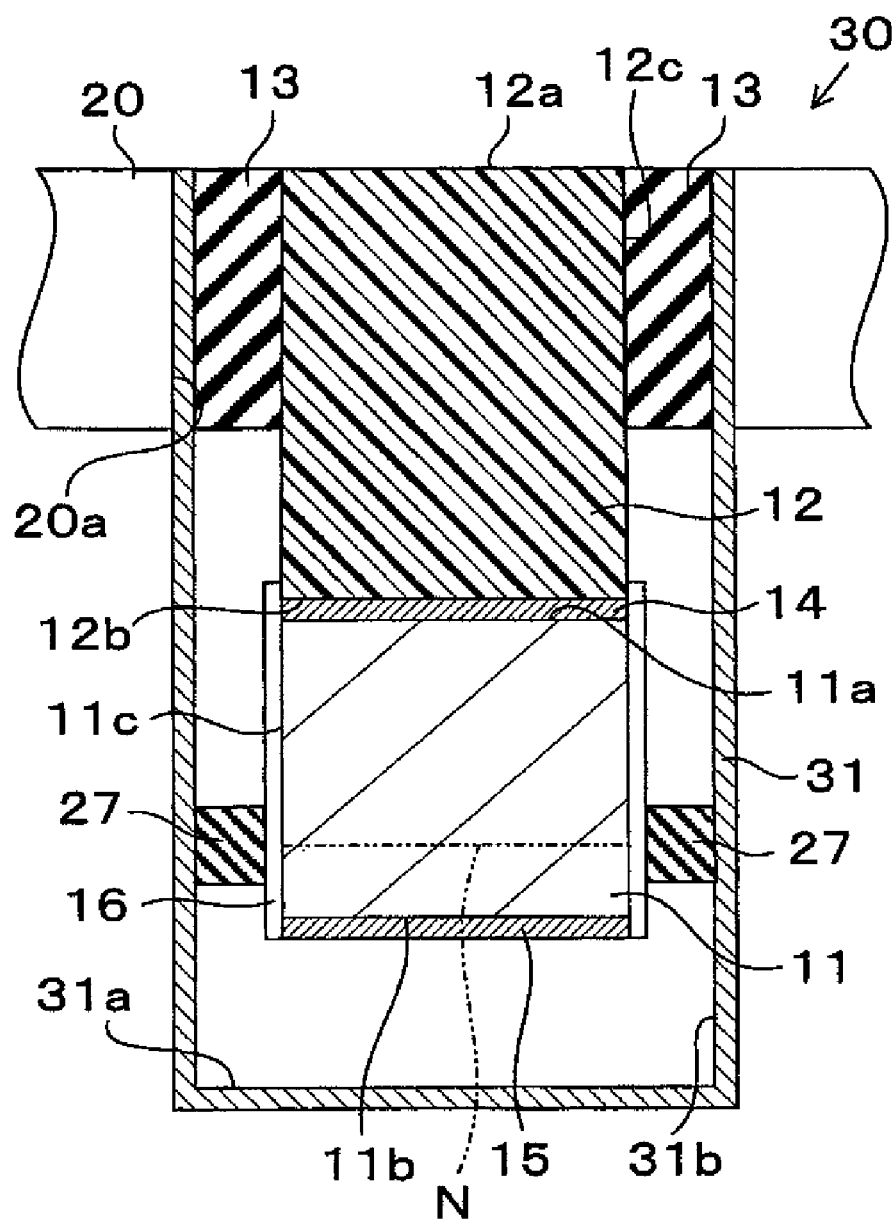
FIG. 4 is a diagram illustrating a cross-sectional view of an ultrasonic sensor according to a modification of the second embodiment.

Alternatively, as shown in FIG. 4, the second cushion member 27 can be located near a node portion of the ultrasonic detector 11. In other words, the second cushion member 27 can be approximately aligned with the node portion of the ultrasonic detector 11. The node portion is a portion where a node N of a standing wave occurring in the ultrasonic detector 11 appears. The node N of the standing wave is a location where the amplitude of the ultrasonic wave propagating in the ultrasonic detector 11 is minimum. As shown in FIG. 4, the node N of the standing wave in the ultrasonic detector 11 appears near the second electrode 15. The location of the node N of the standing wave can be determined by simulation or actual measurement. In such an approach, the second cushion member 27 can hardly affect the ultrasonic wave in the ultrasonic detector 11 so that the detection sensitivity of the ultrasonic sensor 30 can be improved.

Figure 5:
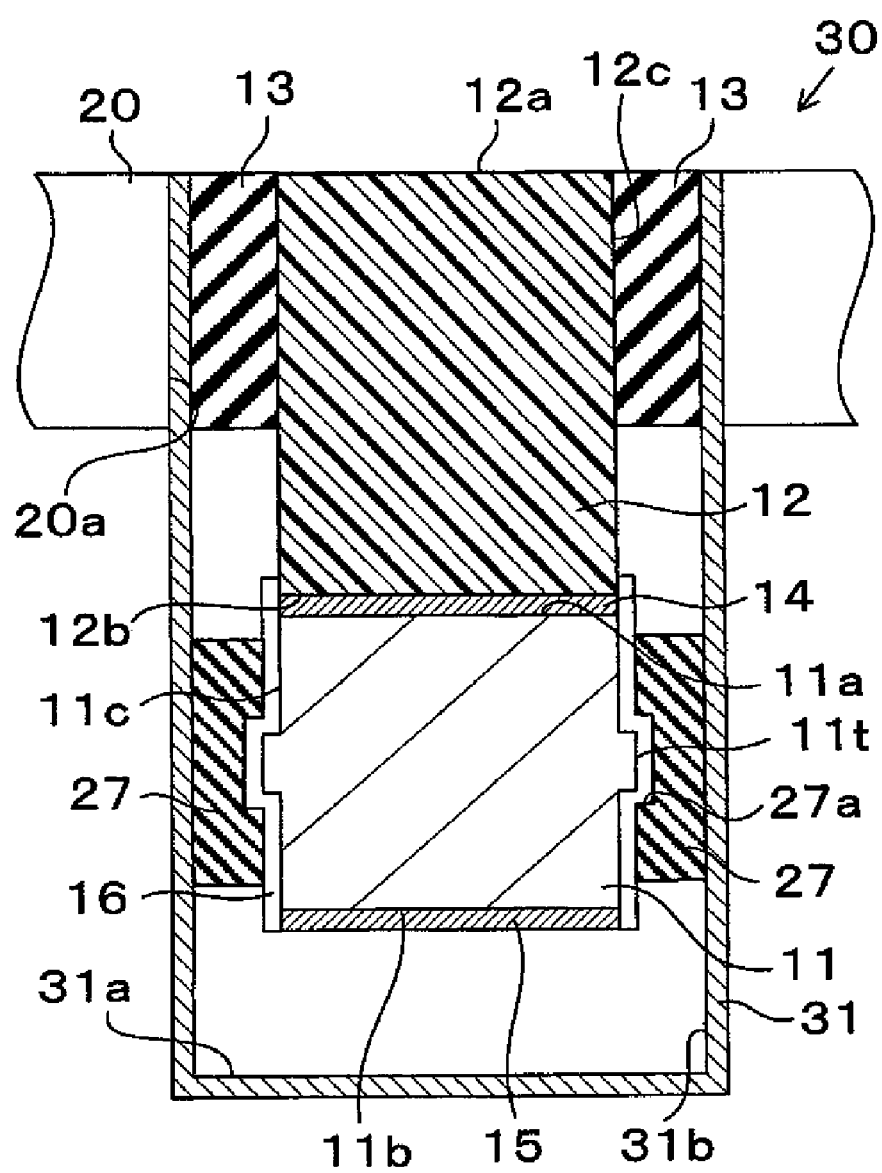
FIG. 5 is a diagram illustrating a cross-sectional view of an ultrasonic sensor according to another modification of the second embodiment.

Alternatively, the ultrasonic detector 11 can have a portion projecting from or recessed in the side wall 11c, and the second cushion member 27 can have a portion engaged with the projecting or recessed portion of the side wall 11c of the ultrasonic detector 11. For example, as shown in FIG. 5, a portion 11t projecting from the side wall 11c is formed around the entire outer perimeter of the ultrasonic detector 11, and a recessed portion 27a engaged with the projecting portion 11t of the ultrasonic detector 11 is formed around the entire inner perimeter of the second cushion member 27. In such an approach, the second cushion member 27 can be accurately positioned with respect to the ultrasonic detector 11. Further, the second cushion member 27 can be prevented from being detached from the ultrasonic detector 11, even when an adhesive agent that bonds the ultrasonic detector 11 and the second cushion member 27 together is degraded, i.e., adhesive force of the adhesive agent is weakened.

The second cushion member 27 can be made of the same material as the protection cover 16. In such an approach, the protection cover 16 and the second cushion member 27 can be integrally formed with each other so that the second cushion member 27 can have the same effect as the protection cover 16. Further, a manufacturing process of the ultrasonic sensor 30 can be simplified.

Like the first embodiment, the protection cover 16 can have a portion extending over the acoustic matching member 12 on the side of the first electrode 14. It is preferable that the length of the extending portion be made as short as possible not to affect the ultrasonic wave. Specifically, it is preferable that the length of the extending portion be less than 1 mm. The protection cover 16 is formed in a shape corresponding to each of the ultrasonic detector 11 and the second cushion member 27, and the second cushion member 27 is fixed to the ultrasonic detector 11 through the protection cover 16. Alternatively, the protection cover 16 can be formed to only the exposed surface of the ultrasonic detector 11, after the second cushion member 27 is fixed to the ultrasonic detector 11.

Figure 6A:
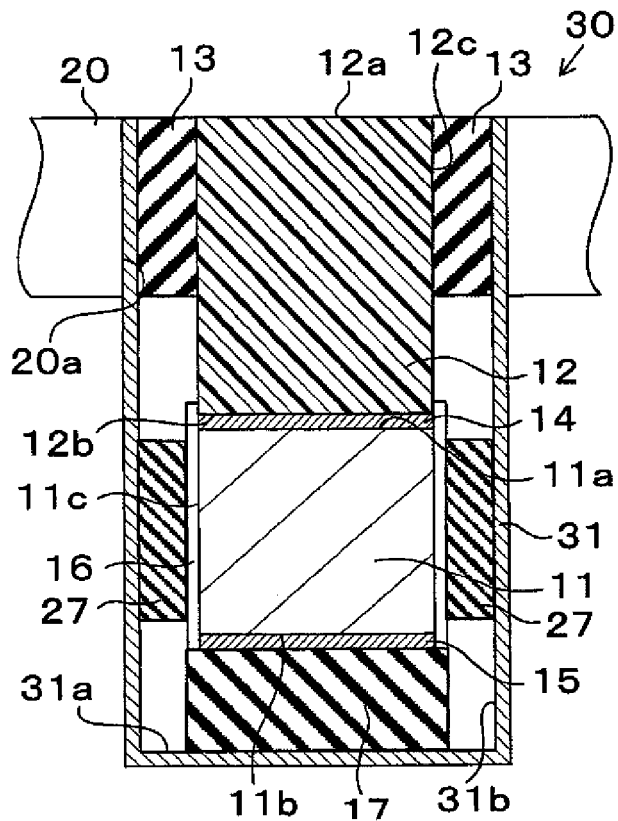
FIG. 6A is a diagram illustrating a cross-sectional view of an ultrasonic sensor according to another modification of the second embodiment.
Figure 6B:
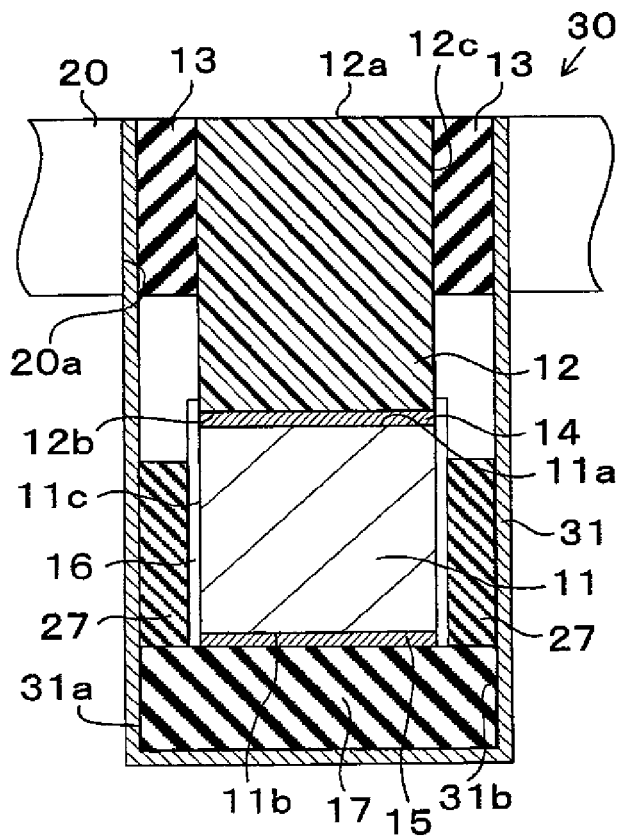
FIG. 6B is a diagram illustrating a cross-sectional view of an ultrasonic sensor according to another modification of the second embodiment.

As shown in FIG. 6A, the ultrasonic sensor 30 can be provided with both the first cushion member 17 and the second cushion member 27. In this case, the first and second cushion members 17, 27 can be made of the same material. Further, as shown in FIG. 6B, the first and second cushion members 17, 27 can be integrally formed with each other. That is, the first and second cushion members 17, 27 can be formed as one piece. In such an approach, a manufacturing process of the ultrasonic sensor 30 can be simplified. Alternatively, the first and second cushion members 17, 27 can be made of different materials. In this case, for example, the first and second cushion members 17, 27 can be formed as separate pieces and then joined together, for example, by using an adhesive agent. For another example, the first and second cushion members 17, 27 can be integrally formed together by coinjection molding technique. The coinjection molding is performed such that the ultrasonic detector 11 is placed in a mold base, and then resin materials for the first and second cushion members 17, 27 are injected into the mold base. In such an approach, the first and second cushion members 17, 27 can be firmly joined together without using an adhesive agent.

As described above, according to the second embodiment of the present invention, the ultrasonic sensor 30 includes the second cushion member 27 instead of or in addition to the first cushion member 17. The second cushion member 27 is located between the ultrasonic detector 11 and the inner side wall 31b of the housing 31. When external force is applied to the ultrasonic sensor 30, the second cushion member 27 absorbs the external force. Thus, the second cushion member 27 helps prevent the ultrasonic sensor 30 from being broken by the external force. Further, since the second cushion member 27 is in contact with only the ultrasonic detector 11, the second cushion member 27 can hardly affect the ultrasonic wave in the acoustic matching member 12. Therefore, the detection sensitivity of the ultrasonic sensor 30 can be ensured.

The second cushion member 27 is symmetrically arranged with respect to the ultrasonic detector 11. Therefore, when the temperature of the ultrasonic sensor 30 changes, the second cushion member 27 equally expands and contracts on opposite sides across the ultrasonic detector 11. Accordingly, the stresses applied by the second cushion member 27 to the ultrasonic detector 11 are balanced so that the detection accuracy of the ultrasonic sensor 30 can be ensured.

The detection sensitivity of the ultrasonic sensor 30 can be improved by placing the second cushion member 27 only near the node portion of the ultrasonic detector 11, where the node N of the standing wave in the ultrasonic detector 11 appears.

Third Embodiment

An ultrasonic sensor 40 according to a third embodiment of the present invention is described below with reference to FIGS. 7A-7C. Differences between the third embodiment and the preceding embodiments are as follows. The ultrasonic sensor 40 includes multiple sensor sets, each of which has one ultrasonic detector and one acoustic matching member.

Figure 7A:
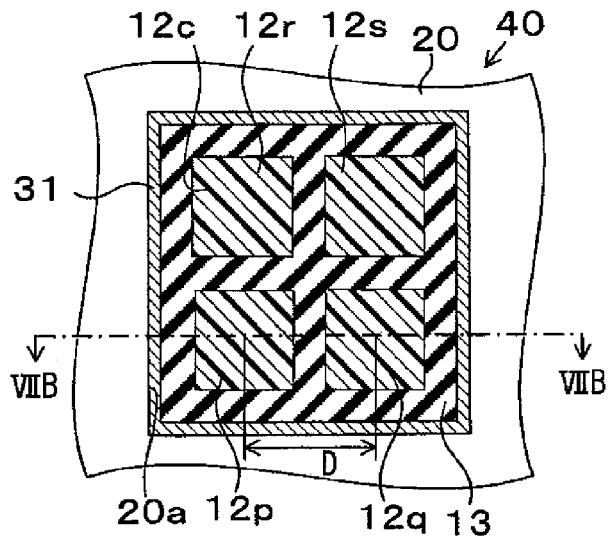
FIG. 7A is a diagram illustrating a top view of an ultrasonic sensor according to a third embodiment of the present invention.
Figure 7B:
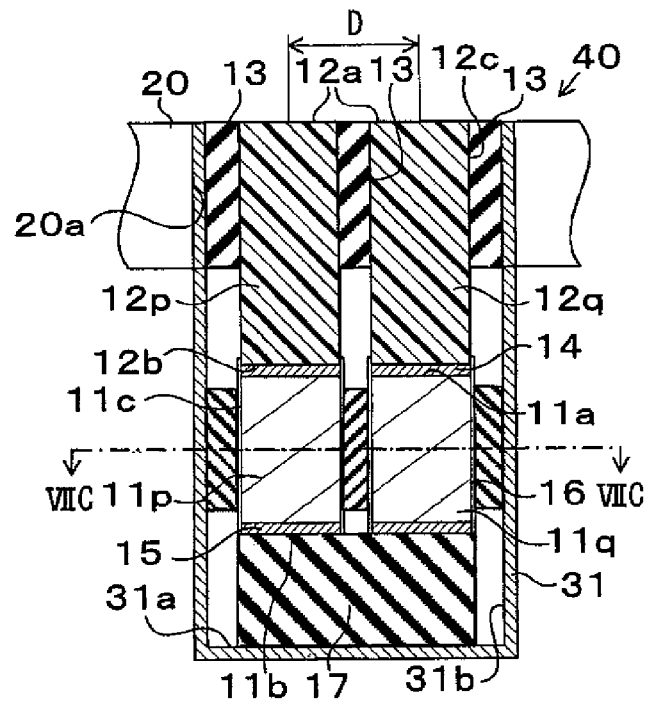
FIG. 7B is a diagram illustrating a cross-sectional view taken along line VIIB-VIIB of FIG. 7A.
Figure 7C:
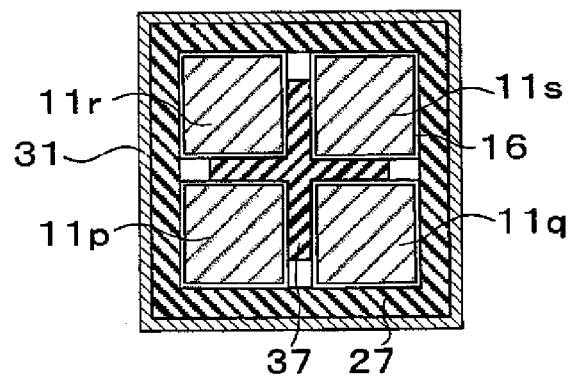
FIG. 7C is a diagram illustrating a cross-sectional view taken along line VIIC-VIIC of FIG. 7B.

As shown in FIGS. 7A-7C, the ultrasonic sensor 40 includes four ultrasonic detectors 11p-11s and four acoustic matching members 12p-12s. The ultrasonic detectors 11p-11s are respectively joined to the acoustic matching members 12p-12s so that four sensor sets are formed. The sensor sets are arranged in an array of two rows and two columns so that the ultrasonic sensor 40 can detect a three-dimensional location of a target to be detected. A vibration isolator 13 is located in clearances between adjacent acoustic matching members 12p-12s. Further, the vibration isolator 13 is located in clearances between the housing 31 and each of the acoustic matching members 12p-12s. Thus, the acoustic matching members 12p-12s are fixed to the housing 31 through the vibration isolator 13. The ultrasonic detectors 11p-11s are electrically coupled to a common processing circuit (not shown) such as an ECU.

As shown in FIG. 7B, the first cushion member 17 is located between the inner bottom wall 31a of the housing 31 and each of the ultrasonic detectors 11p-11s. In the case of FIG. 7B, the first cushion member 17 is formed as one-piece. Alternatively, the first cushion member 17 can be formed as separate pieces, each of which is located between the housing 31 and a corresponding one of the ultrasonic detectors 11p-11s.

As shown in FIGS. 7B, 7C, the second cushion member 27 is located between the inner side wall 31b of the housing 31 and side walls 11b of the ultrasonic detectors 11p-11s. The second cushion member 27 has a rectangular ring shape to surround the ultrasonic detectors 11p-11s along the side walls 11c. In the case of FIG. 7C, the second cushion member 27 is formed as one-piece. Alternatively, the second cushion member 27 can be formed as separate pieces, each of which is located between the inner side wall 31b of the housing 31 and a corresponding one of the ultrasonic detectors 11p-11s.

In addition to the first and second cushion members 17, 27, the ultrasonic sensor 40 includes a third cushion member 37. As shown in FIG. 7C, the third cushion member 37 is at least partially located in each of clearances between adjacent ultrasonic detectors 11p-11s. The third cushion member 37 has a cruciform cross-section and is made of a material having the same characteristics as the material of which the first and second cushion members 17, 27 are made.

Thus, the ultrasonic detectors 11p-11s are sandwiched between the second and third cushion members 27, 37. In such an approach, the ultrasonic detectors 11p-11s are held spaced from each other at a regular interval (i.e., width of the third cushion member 37) and accurately positioned with respect to each other. Further, even when impact force is applied to the receiving surface 12a of the acoustic matching member 12, for example, by a foreign matter (e.g., a small stone) hit against the receiving surface 12a during running of the vehicle, the second and third cushion members 27, 37 absorb the impact force transferred to the ultrasonic detectors 11p-11s. Thus, the second and third cushion members 27, 37 help prevent the ultrasonic detectors 11p-11s from being cracked due to the impact force. Further, the second and third cushion members 27, 37 help prevent the ultrasonic detectors 11p-11s from being displaced toward the inner side wall 31b of the housing 31. Thus, the second and third cushion members 27, 37 help prevent the ultrasonic detectors 11p-11s from being detached from the mounting surface 12b of the acoustic matching member 12. In this way, the second and third cushion members 27, 37 protect the ultrasonic detectors 11p-11 from external force applied to the ultrasonic sensor 40.

The elasticity coefficient of the third cushion member 37 is less than that of each of the ultrasonic detectors 11p-11s, and the third cushion member 37 is in contact with only the ultrasonic detectors 11p-11s. In such an approach, the third cushion member 37 can hardly affect the ultrasonic wave in the ultrasonic detectors 11p-11s and the acoustic matching members 12p-12s. Therefore, the detection sensitivity of the ultrasonic sensor 40 can be ensured.

Like the first and second cushion members 17, 27, it is preferable that the third cushion member 37 be made of a material having an elasticity coefficient of from about 0.1 MPa to about 10 GPa and that a resonant frequency of the third cushion member 37 be approximately equal to a resonant frequency of each of the ultrasonic detectors 11p-11s.

The third cushion member 37 can be made of the same material as the protection cover 16. In such an approach, the protection cover 16 and the third cushion member 37 can be integrally formed with each other so that the third cushion member 37 can have the same effect as the protection cover 16. Further, a manufacturing process of the ultrasonic sensor 40 can be simplified.

The third cushion member 37 is fixed to the side wall 11c of each of the ultrasonic detectors 11p-11s using an adhesive agent. Thus, displacement of the third cushion member 37 can be prevented so that the third cushion member 37 can retain a correct position. Alternatively, the third cushion member 37 can be fixed without using an adhesive agent. For example, the third cushion member 37 is formed to have a width greater than a width of the clearance between adjacent ultrasonic detectors 11p-11s. Then, the third cushion member 37 is compressed to a thickness less than the clearance, and the compressed third cushion member 37 is inserted into the clearance. In such an approach, the third cushion member 37 can be fixed between adjacent ultrasonic detectors 11p-11s without using an adhesive agent. Alternatively, the third cushion member 37 can be formed by filling the clearance with a potting material.

It is preferable that the width of the clearance between the inner side wall 31b of the housing 31 and each of the ultrasonic detectors 11p-11s be equal to the width of the clearance between adjacent ultrasonic detectors 11p-11s. In such an approach, the width of the second cushion member 27 becomes equal to the width of the third cushion member 37. Therefore, even when the temperature of the ultrasonic sensor 40 changes, the amount of thermal expansion and contraction of the second cushion member 27 becomes equal to the amount of thermal expansion and contraction of the third cushion member 37. Accordingly, stress applied by the second cushion member 27 to the ultrasonic detectors 11p-11s balances with stress applied by the third cushion member 37 to the ultrasonic detectors 11p-11s so that the detection accuracy of the ultrasonic sensor 40 can be ensured.

The ultrasonic sensor 40 includes multiple sensor sets arranged in an array. Therefore, the ultrasonic sensor 40 can detect not only the distance from a target to be detected but also the location of the target by calculating time and phase differences between the respective ultrasonic waves received by the ultrasonic detectors 11p-11s. Since the third cushion member 37 located between the ultrasonic detectors 11p-11s is made of a material having a low elasticity coefficient, the third cushion member 37 helps reduce noise resulting from cross talk between the ultrasonic detectors 11p-11s.

The width W (see FIG. 1) of each of the acoustic matching members 12p-12s is set equal to or less than one-half of a wavelength of an ultrasonic wave in air. A distance D between centers of adjacent acoustic matching members 12p-12s is set equal to one-half of a wavelength of an ultrasonic wave. In such an approach, the time differences between the received ultrasonic waves can be detected based on the phase differences between the received ultrasonic waves. Therefore, the time differences can be accurately detected so that the distance from the target and the location of the target can be accurately measured. Even if the width W of each of the acoustic matching members 12p-12s is greater than one-half of the wavelength of the ultrasonic wave in air, the ultrasonic sensor 40 can be used to detect the three-dimensional location of the target.

The number and arrangement of the sensor sets can vary according to the intended use of the ultrasonic sensor. For example, when the ultrasonic sensor 40 has two sensor sets, the ultrasonic sensor 40 can be used to detect a two-dimensional location of a target to be detected.

Figure 8:
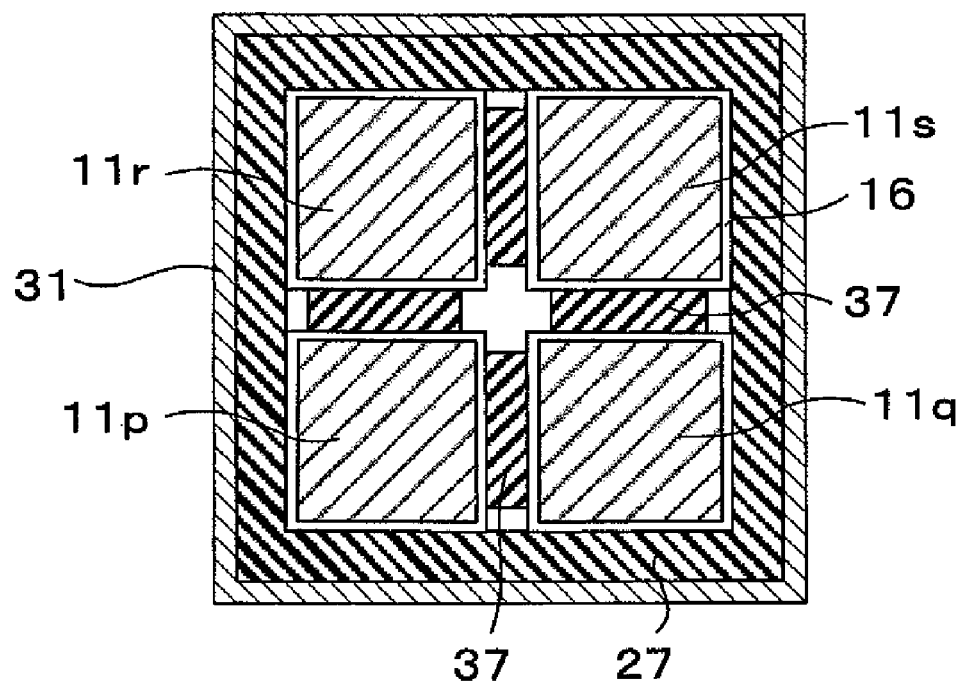
FIG. 8 is a diagram illustrating a cross-sectional view of an ultrasonic sensor according to a modification of the third embodiment.

The shape of the third cushion member 37 can be changed in various manners. For example, as shown in FIG. 8, the third cushion member 37 can be formed as separate pieces, each of which is located in a corresponding clearance between adjacent ultrasonic detectors 11p-11s.

Figure 9A:
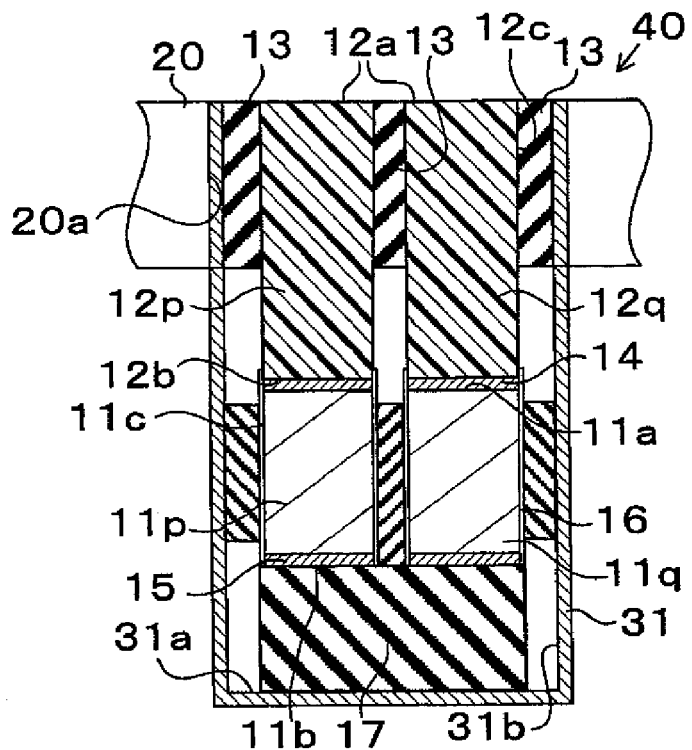
FIG. 9A is a diagram illustrating a cross-sectional view of an ultrasonic sensor according to another modification of the third embodiment.
Figure 9B:
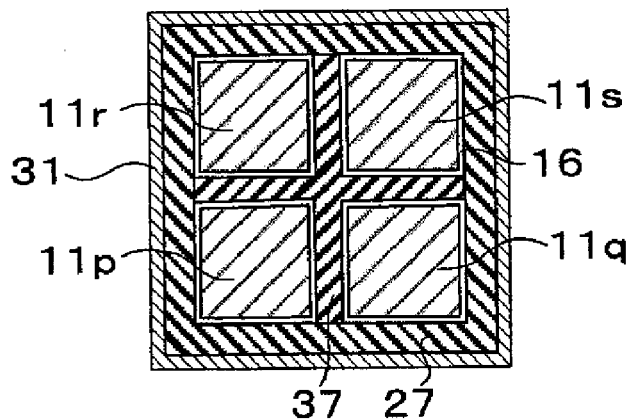
FIG. 9B is a diagram illustrating a cross-sectional view of an ultrasonic sensor according to another modification of the third embodiment.

The third cushion member 37 can be integrally formed with at least one of the first cushion member 17 and the second cushion member 27. For example, as shown in FIG. 9A, the third cushion member 37 can be integrally formed with the first cushion member 17. As shown in FIG. 9B, the third cushion member 37 can be integrally formed with the second cushion member 27. In such an approach, a manufacturing process of the ultrasonic sensor 40 can be simplified.

One or two of the three cushion members 17, 27, 37 can be eliminated from the ultrasonic sensor 40. For example, the ultrasonic sensor 40 can have only one of the first cushion members 17 and the second cushion member 27.

The structures shown in FIGS. 2A, 2B, 4, 5, 6A and 6B can be applied to the ultrasonic sensor 40. For example, the third cushion member 37 can be located only near the node portion of each of the ultrasonic detectors 11p-11s. In such an approach, the third cushion member 37 can hardly affect the ultrasonic wave in the ultrasonic detectors 11p-11s so that the detection sensitivity of the ultrasonic sensor 40 can be improved.

As described above, according to the third embodiment of the present invention, the ultrasonic sensor 40 includes multiple sensor sets arranged in an array. Therefore, the ultrasonic sensor 40 can detect not only the distance from the target but also the location of the target by calculating the time and phase differences between the respective ultrasonic waves received by the ultrasonic detectors 11p-11s.

In addition to the first and second cushion members 17, 27, the ultrasonic sensor 40 includes the third cushion member 37 located between adjacent ultrasonic detectors 11p-11s. Thus, the ultrasonic detectors 11p-11s are held spaced from each other at a regular interval and accurately positioned with respect to each other. Further, even when external force is applied to the ultrasonic sensor 40, the third cushion member 37 absorbs the external force so that the ultrasonic sensor 40 can be protected from the external force. Since the third cushion member 37 is in contact with only the ultrasonic detectors 11p-11s, the third cushion member 37 can hardly affect the ultrasonic wave in the acoustic matching members 12p-12s. Therefore, the detection sensitivity of the ultrasonic sensor 40 can be ensured.

The thermal stress applied by the second cushion member 27 to the ultrasonic detectors 11p-11s can balance with the thermal stress applied by the third cushion member 37 to the ultrasonic detectors 11p-11s by setting the width of the clearance between the inner side wall 31b of the housing 31 and each of the ultrasonic detectors 11p-11s equal to the width of the clearance between adjacent ultrasonic detectors 11p-11s. In such an approach, the detection accuracy of the ultrasonic sensor 40 can be ensured.

The detection sensitivity of the ultrasonic sensor 40 can be improved by placing the third cushion member 37 only near the node portion of each of the ultrasonic detectors 11p-11s.

(Modifications)

The embodiments described above may be modified in various ways. For example, the ultrasonic sensors 10, 30, 40 can be mounted to a vehicle portion other than the front bumper 20. As shown in FIG. 10, the ultrasonic sensors 10, 30, 40 can be mounted to a front headlight cover 21 of a vehicle 60. In such an approach, the ultrasonic sensors 10, 30, 40 can directly receive an ultrasonic wave reflected from an obstacle ahead of the vehicle 60, thereby surely detecting the reflected ultrasonic wave. Therefore, the ultrasonic sensors 10, 30, 40 can be suitably used as a front obstacle sensor for detecting an obstacle ahead of the vehicle 60. The ultrasonic sensors 10, 30, 40 can be mounted to a blinker (i.e., winker) cover 22, a door mirror 23, or a front side door 28 of the vehicle 60. In such an approach, the ultrasonic sensors 10, 30, 40 can be suitably used as a side obstacle sensor for detecting an obstacle on the side of the vehicle 60. The ultrasonic sensors 10, 30, 40 can be mounted to a rear headlight cover 24, a backlight cover 25, or a rear side door 29 of the vehicle 60. In such an approach, the ultrasonic sensors 10, 30, 40 can be suitably used as a rear obstacle sensor for detecting an obstacle behind the vehicle 60.

The ultrasonic sensors 10, 30, 40 can be mounted to an object other than a vehicle. For example, the ultrasonic sensors 10, 30, 40 can be mounted to an indoor robot. If the ultrasonic sensors 10, 30, 40 are used in an environment where the ultrasonic sensors 10, 30, 40 are less likely to be exposed to moisture, moisture vapor, or the like, the protection cover 16 can be eliminated from the ultrasonic sensors 10, 30, 40.

The ultrasonic detector 11 can not only detect an ultrasonic wave but also emit an ultrasonic wave.

Such changes and modifications are to be understood as being within the scope of the present invention as defined by the appended claims.

What is claimed is:

1. An ultrasonic sensor comprising:
    at least one ultrasonic detector configured to detect an ultrasonic wave reflected from a target to be detected;
    at least one acoustic matching member having a mounting surface to which the ultrasonic detector is mounted and a receiving surface opposite to the mounting surface and exposed to space where the target exists to receive the reflected ultrasonic wave, the acoustic matching member being configured to transfer the reflected ultrasonic wave received at the receiving surface to the ultrasonic detector mounted to the mounting surface;
    a housing that accommodates the ultrasonic detector and the acoustic matching member and has an opening through which the receiving surface of the acoustic matching member is exposed to the space, the housing being mountable to an object that uses the ultrasonic sensor;
    a vibration isolator located between the acoustic matching member and a first portion of an inner side wall of the housing to fix the acoustic matching member to the housing, the first portion of the inner side wall being located near the opening, the vibration isolator being configured to damp a vibration transferred from the object to the acoustic matching member;
    a protection cover that covers a surface of the ultrasonic detector to protect the ultrasonic detector from a usage environment factor; and
    a cushion member configured to protect the ultrasonic detector from external force,
    wherein the cushion member includes at least one of a first cushion member and a second cushion member,
    wherein the first cushion member is located between the ultrasonic detector and an inner bottom wall of the housing, and
    wherein the second cushion member is located between the ultrasonic detector and a second portion of the inner side wall of the housing.

2. The ultrasonic sensor according to claim 1, wherein the second cushion member is symmetrically located with respect to the ultrasonic detector.

3. The ultrasonic sensor according to claim 1, wherein the second cushion member is located only near a node portion of the ultrasonic detector, and wherein a node of a standing wave in the ultrasonic detector appears at the node portion of the ultrasonic detector.

4. The ultrasonic sensor according to claim 1, wherein an elasticity coefficient of at least one of the first and second cushion members is less than an elasticity coefficient of the ultrasonic detector.

5. The ultrasonic sensor according to claim 1, wherein a resonant frequency of at least one of the first and second cushion members is about equal to a resonant frequency of the ultrasonic detector.

6. The ultrasonic sensor according to claim 1, wherein a resonant frequency of at least one of the first and second cushion members is greater than a frequency of a disturbance vibration in the object to which the housing is mounted.

7. The ultrasonic sensor according to claim 1, wherein at least one of the first and second cushion members is integrally formed with the protection cover.

8. The ultrasonic sensor according to claim 1, wherein the first and second cushion members are integrally formed with each other.

9. The ultrasonic sensor according to claim 1, further comprising:
    wherein the at least one ultrasonic detector comprises a plurality of ultrasonic detectors,
    wherein the at least one acoustic matching member comprises a plurality of acoustic matching members,
    wherein each of the plurality of ultrasonic detectors is paired with a corresponding one of the plurality of acoustic matching members to form a plurality of sensor sets,
    wherein the plurality of sensor sets is arranged in an array, and
    wherein the vibration isolator is located between adjacent acoustic matching members and located between each acoustic member and the first portion of the inner side wall of the housing.

10. The ultrasonic sensor according to claim 9, wherein the cushion member further includes a third cushion member located between adjacent ultrasonic detectors.

11. The ultrasonic sensor according to claim 10, wherein the cushion member includes the second cushion member, and wherein a clearance between adjacent ultrasonic detectors is about equal to a clearance between each ultrasonic detector and the second portion of the inner side wall of the housing.

12. The ultrasonic sensor according to claim 10, wherein at least one of the second and third cushion members is located only near a node portion of each ultrasonic detector, and wherein a node of a standing wave in each ultrasonic detector appears at the node portion of each ultrasonic detector.

13. The ultrasonic sensor according to claim 10, wherein an elasticity coefficient of at least one of the first, second and third cushion members is less than an elasticity coefficient of each ultrasonic detector.

14. The ultrasonic sensor according to claim 10, wherein a resonant frequency of at least one of the first, second, and third cushion members is about equal to a resonant frequency of each ultrasonic detector.

15. The ultrasonic sensor according to claim 10, wherein a resonant frequency of at least one of the first, second, and third cushion members is greater than a frequency of a disturbance vibration in the object to which the housing is mounted.

16. The ultrasonic sensor according to claim 10, wherein at least one of the first, second and third cushion members is integrally formed with the protection cover.

17. The ultrasonic sensor according to claim 10, wherein at least two of the first, second, and third cushion members are integrally formed with each other.

18. The ultrasonic sensor according to claim 1, wherein the object to which the housing is mounted is a vehicle.

19. The ultrasonic sensor according to claim 18, wherein the housing is mounted to at least one of a headlight cover, a rear light cover, a blinker cover, a backlight cover, a door mirror, a front side door, a rear side door, and a bumper of the vehicle.

* * * * *